US007863571B2

(12) United States Patent
Beken

(10) Patent No.: US 7,863,571 B2
(45) Date of Patent: Jan. 4, 2011

(54) MUON DETECTOR

(76) Inventor: Robert Beken, 8690 Aero Dr., #339, San Diego, CA (US) 92123

( * ) Notice: Subject to any disclaimer, the term of this patent is extended or adjusted under 35 U.S.C. 154(b) by 308 days.

(21) Appl. No.: 12/286,404

(22) Filed: Sep. 30, 2008

(65) Prior Publication Data

US 2009/0101824 A1    Apr. 23, 2009

Related U.S. Application Data

(60) Provisional application No. 60/960,451, filed on Oct. 1, 2007, now abandoned.

(51) Int. Cl.
G01T 1/36 (2006.01)
H01J 47/02 (2006.01)
(52) U.S. Cl. ............... 250/358.1; 250/307; 250/374; 250/382; 250/387; 250/389
(58) Field of Classification Search ............... 250/307, 250/358.1, 374, 382, 387, 389
See application file for complete search history.

(56) References Cited

U.S. PATENT DOCUMENTS 4,504,438 A * 3/1985 Levy et al. .................. 376/156
4,965,861 A * 10/1990 Filthuth .................... 250/385.1
2008/0128604 A1* 6/2008 Bryman ..................... 250/266
2008/0265156 A1* 10/2008 Morris et al. ............... 250/305

FOREIGN PATENT DOCUMENTS

JP    2007271400 A  * 10/2007

* cited by examiner

Primary Examiner—David P Porta
Assistant Examiner—David S Baker

(57) ABSTRACT

An economical position-sensing muon detector for muon radiography is constructed using a pair of glass plates spaced apart by crossed parallel barriers. Smaller detector wires are interspersed between the barriers and an ionizing gas is used to fill the space between the plates. A muon striking near where detector wires cross causes a local momentary current flow. The current flow in two of the detector wires is sensed to determine the coordinates of the muon impact. Such muon detectors can be assembled in modular surface arrays and such arrays can be positioned on spatial surfaces for differential inspection and detection of muons transiting through and emanating from objects placed within the inspection space. Such a detector constitutes a novel and useful invention in providing an inspection device and means for cargo or cargo vehicles that detects muons transiting through and emanating from hazardous materials intended to cause malicious harm.

10 Claims, 3 Drawing Sheets

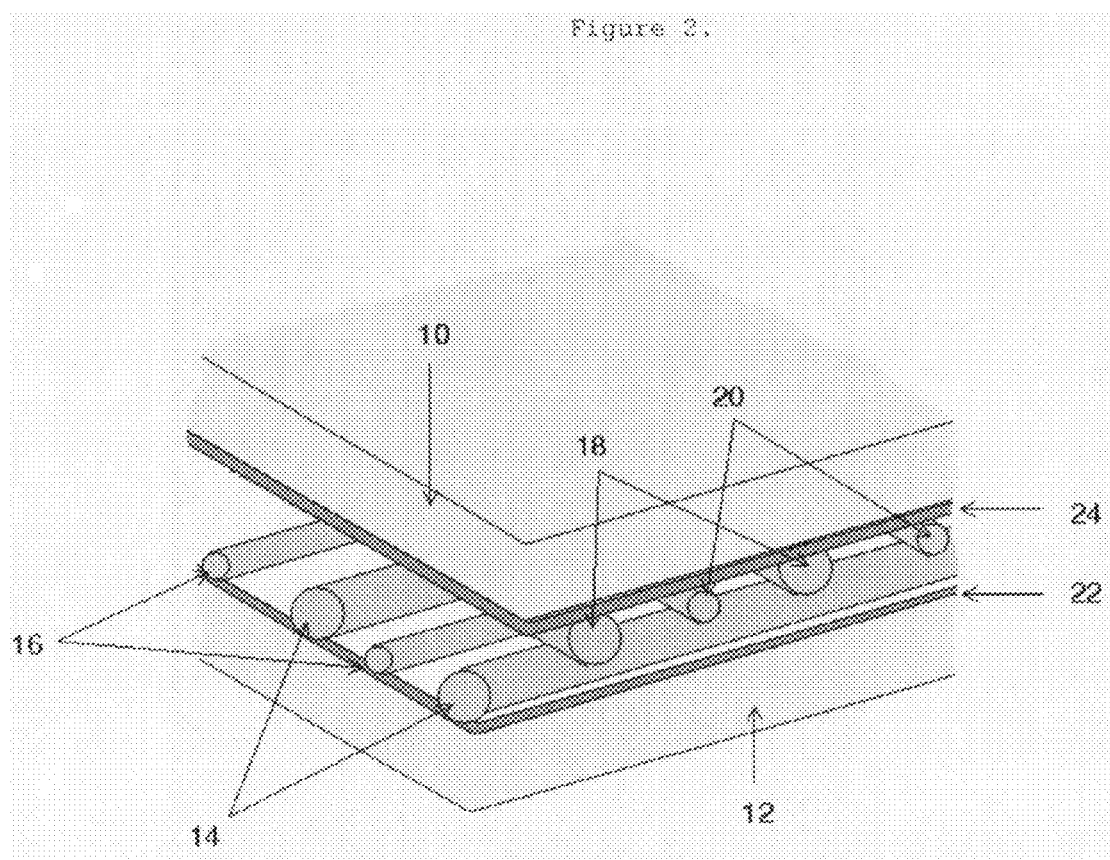

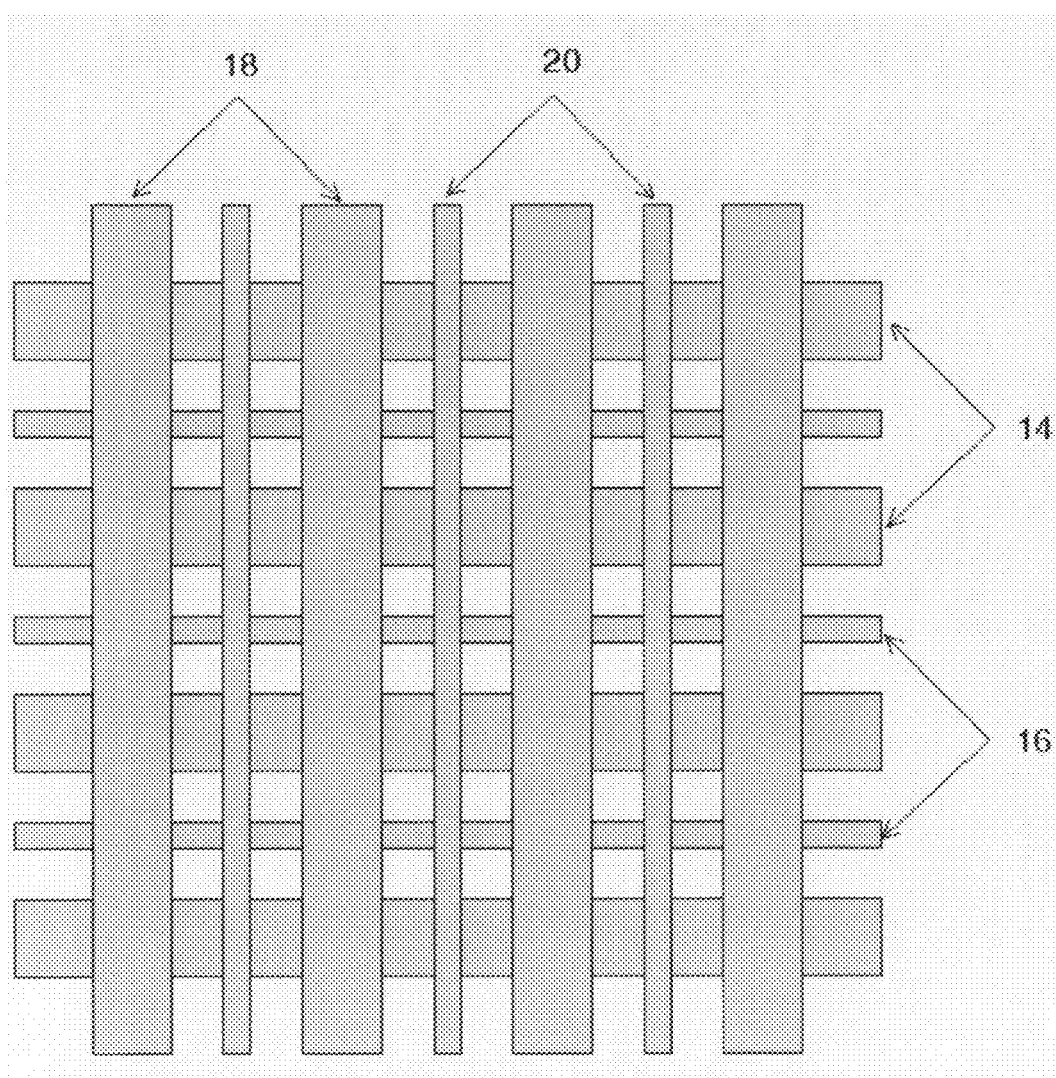

MUON DETECTOR

RELATED U.S. APPLICATION DATA

This invention derives from Provisional Patent Application 60/960,451 dated Oct. 1, 2007 filed with the U.S. Patent and Trademark Office now abandoned.

BACKGROUND OF THE INVENTION

The present invention relates to a detector for ionizing particles, especially muons.

Mu mesons or muons are created in the upper atmosphere by cosmic rays. Muons reaching the earth's surface have very high energies, typically 3 to 4 Gev, and are capable of penetrating substantial thickness of objects. Muons have much greater penetrating power than x-rays, so the detection of muons can be used to determine the internal structures of large or dense objects. Muons have been used to reveal the internal structures of pyramids [see L. W. Alvarez, et. al., Search for Hidden Chambers in the Pyramids Using Cosmic Rays, Science 167 (1970) 832.] and volcanoes [see H. Tanaka, et al., Development of a two-fold segmented detection system for near horizontally cosmic-ray muons to probe the internal structure of a volcano, Nuclear Instruments & Methods in Physics Research A, 507 (2003) 657].

Recently, there has been interest in muon detection techniques for inspecting cargo for nuclear materials. L. J. Schultz [see Cosmic Ray Muon Radiography, PhD thesis, Portland State University (2003), http://www.cgsd.com/ref/Schultz-.pdf] explains the principles involved in producing an image from muon detection data, known as muon radiography. There are three basic approaches. These are (1) to measure the momentum lost by muons passing through objects, (2) to measure the relative numbers that fail to emerge, called "range out." from the objects, and (3) to measure the relative scattering of muons passing through an object.

All three methods require muon detection, and in particular the determination of the trajectory of muons potentially traversing the objects being imaged. Blanpied, et al, [see Radiographic Imaging with Cosmic Ray Muons, slide presentation, Los Alamos National Laboratory, March 2005, http://www.cgsd.com/ref/Blanpied.pdf] states that measuring the momentum loss is too expensive with present technology and opines that the scattering technique is best for cargo inspection while the range out method is best for studying geological formations.

Gustafsson [see Tomography of canisters for spent nuclear fuel using cosmic ray muons, Uppsala University Neutron Physics Report UU-NF 05#08, October 2005, http://www.cgsd.com/ref/Gustafsson.pdf] provides an analysis of a proposed use of the scattering method for inspection purposes.

For the scattering and range out methods the practice is to use two parallel planar arrays of detectors separated by a few feet. An arriving muon is detected in each plane nearly simultaneously, and the x,y coordinates in each plane used to determine the three-dimensional line of travel. The accuracy of the determination is limited by the resolution of the detector arrays.

Geiger counters are known in the prior art as devices used to detect muons. In principle, an array of Geiger tubes in a plane could be used to determine the coordinates of an arriving muon that passes through one of the tubes in the array. Further, Geiger-Muller tubes are a type of gas detector in which ions created by the energetic muon are detected by the current flow between anode and cathode in the tube created by the ionization. The ionization can also be detected optically by photographing the ionization trail in a drift chamber, or by using a photomultiplier tube to detect the light emitted during ionization. While such devices are known and foreseeable methods to detect muon positions, the high cost to assemble a commercially viable unit is a limitation of these detection methods.

An alternative to gas detectors is to use crystals that emit light when struck by a muon. Each crystal is paired with a photomultiplier that detects the light path. The preferred crystalline material is CZT. M. L. McConnel et al., [see "Three-dimensional imaging and detection efficiency performance of orthogonal coplanar CZT strip detectors," Proc. SPIE, Vol. 4141 (2000) 157]. Both the crystal material and the photomultipliers are costly. An advantage of crystal-based detectors is that the sensitivity of the sensor cells is quite uniform because the size and properties of the crystals are uniform.

Yet another approach is to use a series of longitudinal detectors side by side to determine the muon coordinates. In the version by Schulz, long Geiger-Muller tubes are laid side by side in a plane. Each tube has a central anode wire. A muon strike causes a current pulse which travels to the ends of the tube. A timing measurement determines the point along the tube of the ionization. Thus, which tube is struck determines one coordinate of the arrival in the plane of the detectors, and the timing measure determines the other coordinate.

Mockett et al, in U.S. Pat. No. 4,504,438, also uses a combination of longitudinal detectors and timing, but in a cylindrical arrangement for use in determining geological formations around a bore hole. The invention determines one coordinate, the azimuth, by determining which of the parallel vertical wires is conducting current. The other coordinate, the vertical displacement, is determined by timing the propagation of the pulse detected concurrently in a helically wound wire. Concentric detectors are used to determine the three-dimensional trajectory of the muon.

A position sensing photomultiplier tube incorporating a wire grid anode is known in prior art. [see Knoll, Glenn F.; Radiation detection and measurement, 3rd Edition, Wiley, New York, 2000 pp 300-302]. This detector uses a photocathode sheet. Both the horizontal and vertical wires in the anode grid are charged with the anode voltage. However, it detects photons in the ultraviolet spectrum and cannot detect muons.

More recently, Shpantzer et al in US20070102648A1 [Method and system for nuclear substance revealing using muon detection] discloses a concealed nuclear material detection system which compares actual muon coordinate and actual incidence angle with predicted coordinate and incidence angle for each muon for detecting nuclear materials. The US20070102648A1 application uses a prior art muon detector in a system for relatively small objects that is unrelated to the muon detector invention disclosed herein. US20070102648A1 depends upon the deflection angle and not upon whether or not the muon was absorbed by the cargo under scrutiny. Further, the position of the object within the space must be well defined to calculate the deflection angle. The present invention is distinguished because it makes no assumptions as to object size and can be used to reconstruct a three-dimensional representation of the objects in the cargo.

Finally, Morris et al in US20080191133A1 [RADIATION PORTAL MONITOR SYSTEM AND METHOD] discloses a portal monitoring system for inspecting occupied vehicles which has cells with operating gas, and detecting sources where the system detects materials or devices occupying the inspection volume from multiple scattering of particles. The US20080191133A1 patent application is on a detection system using drift cell muon detectors. Drift cell muon detectors are known in prior art. The drift cell detector is essentially Geiger tubes having a central conductor and an outer conducting tube shell. The present invention is distinguished in that it is a flat plate detector and does not use either tubes or an outer conducting surface. Further, the present invention discloses a detector using a wire grid and non-conducting outer plates whereas the US20080191133A1 application does not use plates, a grid, or non-conducting outer surfaces and is inherently more expensive to construct and less accurate in muon detection.

Muon detectors are known in the art and prior art detectors function to detect muons and to determine their trajectories. The limitations are in the size, resolution, and cost of the detectors in the prior art.

Therefore, it is an object of the present invention to provide a muon detector having high resolution.

It is a further object of the invention to provide a detector that can be constructed at low cost.

It is a further object of the invention to provide a volumetrically scalable detector system that is a plurality of low cost detectors arranged in correspondent surface modules.

It is a further object of the invention to provide a detector that provides uniform sensitivity from detector cell to detector cell.

SUMMARY OF THE INVENTION

In the present invention a novel muon detector for muon radiography is constructed using a pair of glass plates spaced apart by barriers. In a preferred embodiment, the barriers are in two sets, each set being parallel stainless steel wires. Such barriers which are affixed to one plate are assembled perpendicular to and in contact to the barriers affixed to the other plate. Smaller detector wires are interspersed between the barriers and an ionizing gas is used to fill the space between the plates. A muon striking near where detector wires cross causes a local momentary current flow. The current flow in two of the detector wires is sensed to determine the coordinates of the muon impact. The low cost design is suitable for producing images in security scanning applications.

BRIEF DESCRIPTION OF THE DRAWINGS

FIG. 2 is a cutaway view detail of the muon detector panel.

FIG. 3 is a plan view detail of the muon detector panel.

DESCRIPTION OF PREFERRED EMBODIMENTS OF THE INVENTION

Figure 1:
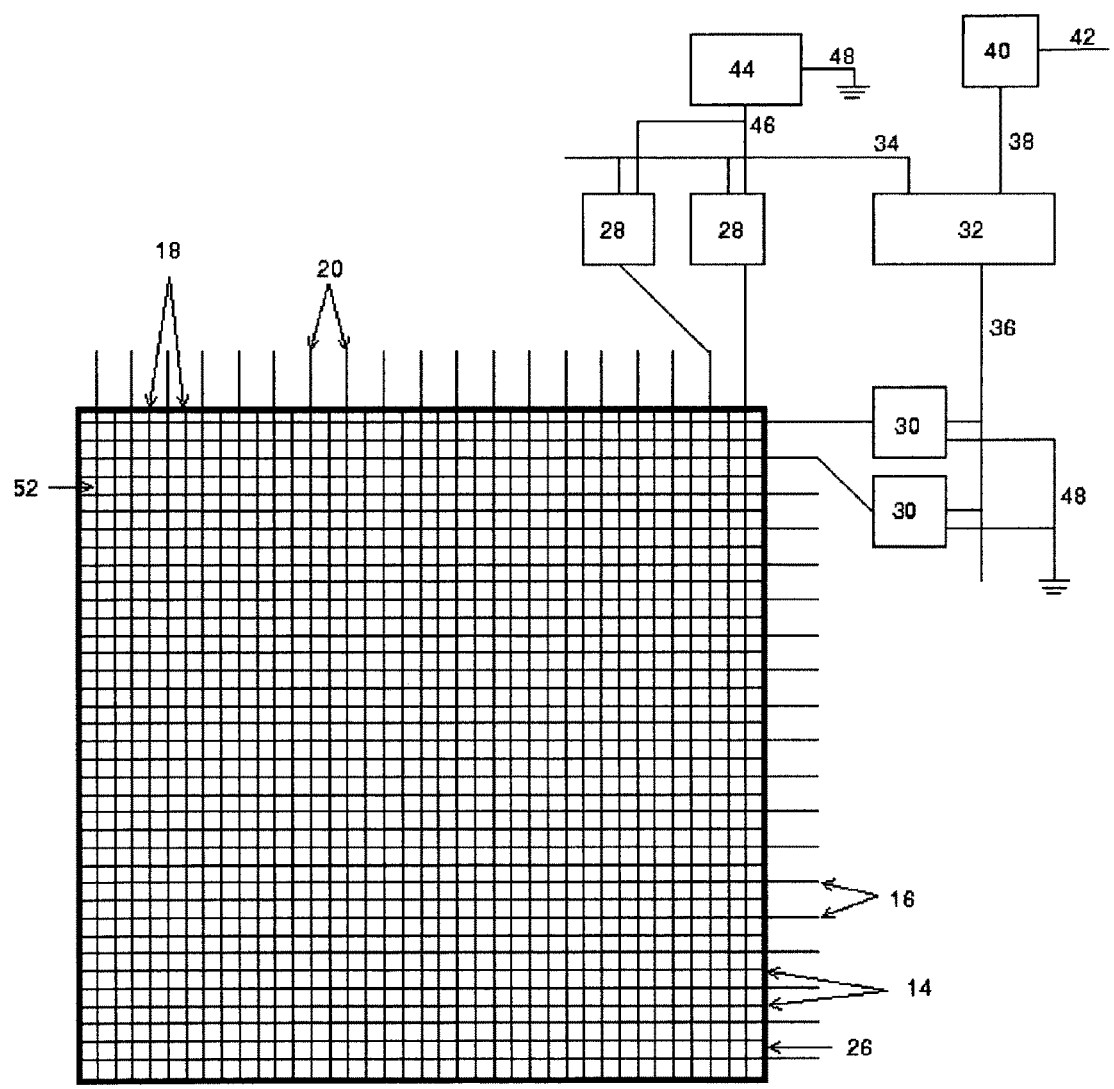
FIG. 1 is a plan view of the muon detector panel with a block diagram of the electronics.

With reference to FIG. 1, the invention consists of a detector panel assembly and sensing electronics.

With reference to FIG. 2, the detector panel comprises a first plate 10 and a second plate 12. The plates are maintained in parallel alignment and constant separation distance by a set of equally spaced x barriers 14 and equally spaced y barriers 18. The x barriers 14 run perpendicular to the y barriers 18. The x and y barrier sets contact each other where they cross. The y barriers 18 are fixed in spacing and held in contact with the first plate 10 by a thin layer of epoxy 24. The x barriers 14 are fixed in spacing and held in contact with the second plate 12 by a thin layer of epoxy 22.

A set of parallel y detection wires 20 is positioned between the y barriers 18. The y detection wires 20 and the y barriers 18 alternate with each detection wire 20 midway between adjacent barriers 18. The y detection wires 20 are fixed in spacing and held in contact with the first plate 10 by the thin layer of epoxy 24.

A set of parallel x detection wires 16 is positioned between the x barriers 14. The x detection wires 16 and the x barriers 14 alternate with each detection wire 16 midway between adjacent barriers 14. The x detection wires are fixed in spacing and held in contact with the second plate 12 by the thin layer of epoxy 22.

With further reference to FIG. 2, in the preferred implementation the plates 10, 12 are made of glass 0.25 inch thick and one foot square. The barriers 14, 18 are 22 gauge stainless steel wires, approximately 24 millimeter in diameter. The detector wires 16, are 30 gauge stainless steel, approximately 8 millimeter in diameter. The epoxy is a low-outgassing type approved for use with a partial vacuum. The epoxy layers 22, 24 are each approximately 3 millimeter thick.

The plates 10, 12 may be of any composition that presents a non-conducting surface to the attached detectors wires, 20 and 16 respectively. Glass is preferred because it is inexpensive, rigid, and flat. The barriers 14, 18 may be made of any material, conducting or non-conducting. Stainless steel wire is preferred because it is strong, flexible, and relatively inexpensive. The detector wires 16, may be made of any good conductor of electricity. Stainless steel wire is preferred because it is strong, flexible, and resists corrosion.

The barriers 14, 18 may have rectangular cross section. A rectangular cross section has greater strength at the crossover contacts, but conventional round wire is less expensive.

The detector wires 16, 20 are placed with 0.1 inch between the centers of adjacent wires. The barriers 14, 18 are similarly spaced with 0.1 inch between centers of adjacent barriers. Each 12 inch square detector plate 10, 12 will have 120 detector wires 16, 20 and 121 barriers 14, 18. The one extra barrier provides for a barrier at both edges of the array of parallel detector wires 16, 20 and barriers.

The first plate 10 having affixed y detection wires and y barriers is mounted to the second plate 12 having affixed x detection wires and x barriers. Referring now to FIG. 1, mounting is accomplished by aligning the edges of the plates with the wires of the first plate perpendicular to those of the second plate with the barriers in contact and forming an epoxy seal 26 around the edges of the plates and filling the gap between them.

With further reference to FIG. 2, a fine metal tube 50 [not shown] traverses the seal. The tube allows the air between the first plate 10 and the second plate 12 to be evacuated and then replaced with a selected fill gas. The tube is sealed after filling. The tube may be placed in any convenient location through the seal.

The fill gas is preferably argon. Argon is inert so that combustion products will not be formed when electrical discharge occurs within the detector plate assembly. A pressure less than one atmosphere is preferred to increase the sensitivity to ionizing muons. With respects to preferred gas mixtures such as argon and carbon dioxide, the pressure and composition of the fill gas may be adjusted; a) for sensitivity and to; b) vary the time after each muon detection that the ionized gas conducts electricity. The adjustment of fill gas pressure and composition is known to the art.

With reference to FIG. 1, the barriers 14, 18 are trimmed even with the outer edges of the plates 10, 12. The x detection wires 16 are trimmed even with one edge of the plates 10, 12 and protrude beyond the seal 26 on the opposite edge. Similarly, the y detection wires 20 are trimmed even with one edge of the plates 10, 12 and protrude beyond the seal 26 on the opposite edge. The wires 16, 20 protrude to facilitate electrical connection.

Referring now to the plan view of FIG. 1, detector cells 52 are formed with each cell bounded by each adjacent pair of x barriers 14 crossing an adjacent pair of y barriers 18. In the center of each cell 52 an x detector wire 16 crosses a y detector wire 20. Because the barriers 14, 18 are thicker than the detector wires 16, 20, the detector wires 16, 20 are separated by a gap. The cell 52 is filled with ionizing gas.

If the plates 10, 12 are one foot square and the barriers are on 0.1 inch centers, an array of 120×120=14,400 detector cells 52 is formed.

Referring to FIG. 1, the positive voltage from a direct current power supply 44 is electrically connected to each of a set of x current sensors 30. Each x current sensor 30 connected to an x detector wire 16. The voltage drop across the current sensor 30 is negligible, so the positive voltage appears on the x detector wires 16. The y detector wires 20 are connected through y current sensors 28 to a common ground 48. The power supply 44 is also connected to the common ground 48.

Until a muon strikes a cell 52 the ionizing gas is not conductive so no current flows through the detector plate assembly. The electric field is concentrated at the points where the x detector wires 16 cross the y detector wires 20. A muon striking a cell 52 produces ionized gas molecules within the cell 52. The ionized molecules are accelerated by the electric field and carried towards the detector wires 16, 20. The accelerating ions collide with other gas molecules, causing a chain reaction which results in a momentary current flow between x detector wire 16 and the y detector wire 20 that cross within cell receiving the muon. For each muon strike, one of the x current sensors 30 and one of the y current sensors 28 will momentarily detect current flow.

The x current sensors 30 communicate to processor 32 through a x bus 36. Similarly, the y current sensors 28 communicate with the processor through a y bus 34. When current is sensed by any y current sensor 28, the processor records the time of the strike and concurrently polls the x current sensors 30 and the y current sensors 28 by stepping through the sensor address from 0 to 119 in each of the x and y sensors sets 30, 28 until the address of the conducting cell 52 is found. The process sends the time and cell address over an interface bus 38 to computer interface logic 40. The computer interface logic 40 in turn provides a network interface 42 so that the user may access the detector data for processing or display.

The construction of current sensors 28, 30 is well known in prior art. The construction of a processor 32 with scanning, memory, and bus interface circuitry is a straightforward digital circuit design known in the art. The preferred network interface 40 is an adapter for gigabit Ethernet.

The preferred embodiment of the muon detector invention thus described does not preclude other novel elements to accomplish the invention's useful purposes. For example the invention may be practiced where the plates 10 and 12 are fabricated with uniformly spaced grooves on the respective interior surfaces which receive the respective detector wires 16 and 20. Fabricating the plates of appropriate thickness with grooves on the interior surfaces to appropriate depths will then obviate the need to install barriers 14 and 18 on the respective x and y plates to achieve proper gap spacing of wires of the x and y plates from each other. Alternatively, such plates can cast or formed in situ such that proper recessed gaps and interior surface protrusions accomplish the detector wire pathways described previously.

In another alternative embodiment of the invention, a barrier layer may be laminated or adhered to the respective interior plate surface and a masking and etching process may be used to eliminate parallel channels of the barrier layer resulting in grooves into which detector wire can be inserted. Further, after removal of barrier materials, a conductive material can be surface deposited in the grooves to create in situ the detector wire assembly.

The muon detector panel thus disclosed is a unitary detector for a unit surface capable of detection of muons passing in either direction through the non-conducting detector surfaces. The time of arrival of the muon strike is provided with the measurement so that external processing by the user can determine coincidence on multiple detectors. The alignment of multiple detectors can be configured to examine the ingress and egress of muons within a confined space. The detectors thus described can measure both position and energy of detected muons. Objects within the confined space will influence the egress of muons either by Compton effects to transiting muons or emission of muons. Detection patterns thus obtained can be used to construct images of objects within the confined space whose detail increases with increasing time allowed for muon detection. For such applications, the clocks within the processors can be synchronized using a signal received by the gigabit Ethernet adapter.

Muons arrive at the approximate rate of 950 per square foot per minute, corresponding to an average of one muon every 63 milliseconds for a one square foot detector. There will a dead time after a muon is detected before the system is ready to record the next muon arrival. The dead time is required to scan the addresses. A dead time of 630 microseconds is reasonable for scanning 120 addresses using current technology. Approximately one percent of the arriving muons is then lost to due to the dead time. That loss is acceptable for use of the detector in muon radiography, as it means that the time to form an image will be increased by one percent.

The present invention is distinguished from prior art by its use of current detection to obtain both x and y coordinates of the muon strike. In prior art, a high precision timing measurement is used to obtain one of the coordinates of the strike. A second distinguishing feature is the use of crossed barriers to inexpensively maintain a precise separation between the surfaces containing the ionizing gas. The use of crossed barriers also supports the surfaces against collapse from air pressure when the ionizing gas is maintained at less than atmospheric pressure. Overall, the combination of features uniquely provides a muon detector with high resolution, reliability, and low cost.

I claim:

1. A thin detector panel for detecting and locating muons comprising:
    a) an outer x plate having a non-conductive surface;
    b) an outer y plate having a non-conductive surface;
    c) an x set of detector wires running in parallel and affixed to the interior surface of the x plate;
    d) an x set of barriers having thickness greater than the wires in the x set of detector wires and affixed to the interior surface of x plate with each barrier separating adjacent detector wires;
    e) a y set of detector wires running in parallel and affixed to the interior surface of the y plate;
    f) a y set of barriers having thickness greater than the wires in the y set of detector wires and affixed to the interior surface of y plate with each barrier separating adjacent detector wires;
    g) aligning the x plate parallel to the y plate to where each plate adjoins the interior surface of each plate;

h) aligning the x plate parallel to the y plate where the wires and barriers of the x plate are perpendicular to the wires and barriers of the y plate; and i) a power supply providing a predetermined voltage electrically connected between the x set of detector wires and the y set of detector wires.

2. A means to assemble the detector panel of claim 1, comprising:

a) sealing means for affixing the interior surface of the x plate, said surface comprising an affixed x set of detector wires, and an affixed x set of barriers to the interior surface of a y plate, said y plate interior surface comprising an affixed y set of detector wires, and an affixed y set of barrier wires wherein the x set of detector wires is perpendicular to the y set of sense wires and the spacing of the plates is determined by contact of the x set of barriers with the y set of barrier;

b) sealing means where the sealing component may comprise an epoxy or other chemical sealant or a Mallory bond;

c) filling means through the sealed plates or seals for filling the space between the sealed plates with a gas at or below atmospheric pressure;

d) x electronic current sensing means connected to each wire in the x set of detector wires for determining which wire has current flow;

e) y electronic current sensing means connected to each wire in the x set of detector wires for determining which wire has current flow; and f) electronic interface means having input electrical connections to the x electronic sensing means and the y electronic sensing means and an output electrical connection for transmitting the address of a muon strike to an external electronic system.

3. The detector panel of claim 1, wherein a) the x and y plates are made of insulated plates;

b) the panels in one embodiment may be one foot square;

c) the x and y sets of detector wires are 30 gauge stainless steel; or d) the first and y sets of barriers are stainless steel wires or barriers, or non conducting cords of KEVLAR or Polythene, or Vectran, or fiberglass or other materials larger than 30 gauge; and e) the detector wires are regularly spaced 0.1 inch apart.

4. The assembly means of claim 2, wherein a) the sealing means is low-outgassing epoxy;

b) the filling means is a metal tube passing through the epoxy seal; and c) the filling gas comprises argon at a pressure of 50 torr.

5. The detector panel of claim 1, wherein a) the x and y plates are made of insulated plates fabricated with parallel grooves on the respective interior surfaces to receive detector wires; and b) the x and y plate projections between the parallel grooves substitute as respective x and y barriers to maintain proper spacing of the x plate from the y plate.

6. The detector panel of claim 5, wherein the detector wire is created by a conductive material deposition in the parallel grooves.

7. The detector panel of claim 1, wherein a) the x and y plates are made of insulated plates fabricated with a barrier layer of suitable thickness on each interior surface;

b) The respective barrier layers receive a masking agent to in order etch the unmasked barrier layer to create parallel recesses to receive detector wires; and c) the remaining x and y plate barrier materials substitute as respective x and y barriers to maintain proper spacing of the x plate from the y plate.

8. The detector panel of claim 6, wherein the detector wire is created by a conductive material deposition in the etched recesses.

9. The detector panel of claim 1, wherein a detector panel system comprises more than one detector panel.

10. The assembly means of claim 2, wherein the electronic interface means for transmitting the address of a muon strike to an external electronic system comprises more than one detector panel.

* * * * *